US006193096B1

(12) United States Patent
Raoult

(10) Patent No.: US 6,193,096 B1
(45) Date of Patent: Feb. 27, 2001

(54) COVER WITH PREHENSILE BUTTON

(75) Inventor: Philippe Raoult, Pringy (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 09/308,688

(22) PCT Filed: Dec. 4, 1996

(86) PCT No.: PCT/FR96/01934

§ 371 Date: May 24, 1999

§ 102(e) Date: May 24, 1999

(87) PCT Pub. No.: WO98/24351

PCT Pub. Date: Jun. 11, 1998

(51) Int. Cl.7 .............................. B65D 25/28; A47J 36/06

(52) U.S. Cl. .................................... 220/573.1; 220/212.5; 220/293; 220/912; 16/425; 16/433; 16/441

(58) Field of Search ................................ 220/212.5, 912, 220/573.1, 300, 297, 293, 254, 753, 768; 16/114 R, 114 A, 118, 110, 110.1, 422, 425, 433, 441

(56) References Cited

U.S. PATENT DOCUMENTS

| | | | |
|---|---|---|---|
| 1,759,771 | | 5/1930 | Willi . |
| 2,590,395 | * | 3/1952 | Fry .................................... 220/212.5 |
| 2,733,052 | * | 1/1956 | Luther .............................. 220/254 X |
| 3,278,074 | | 10/1966 | Yamazaki . |
| 5,584,414 | * | 12/1996 | Neubeck ...................... 220/DIG. 21 |
| 5,771,783 | * | 6/1998 | Uss ...................................... 220/912 |

FOREIGN PATENT DOCUMENTS

| | | | |
|---|---|---|---|
| 387708 | | 3/1989 | (AT) . |
| 4231360 | * | 3/1994 | (DE) . |
| 94/04062 | * | 3/1994 | (WO) . |

* cited by examiner

*Primary Examiner*—Nathan J. Newhouse
(74) *Attorney, Agent, or Firm*—Young & Thompson

(57) ABSTRACT

A lid with a holding knob and coupling elements designed to secure the holding knob to the lid. The coupling elements comprise at least one lug and a notch having an entry portion for the lug to pass through the notch, as well as a retaining portion for retaining the lug in the slot. The lug is mobile between the entry portion and the retaining portion, when the knob and lid are moved relative to one another.

13 Claims, 2 Drawing Sheets

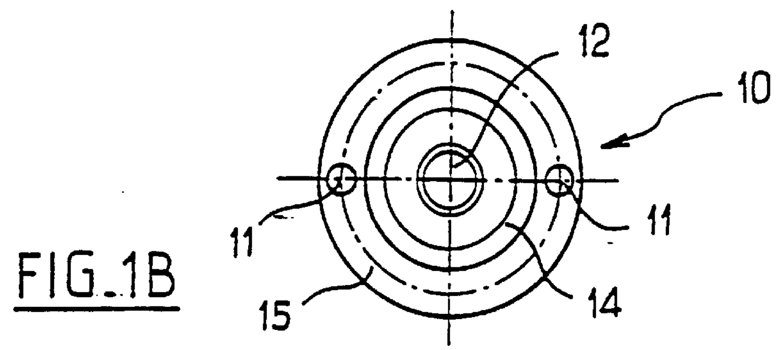
FIG_1B
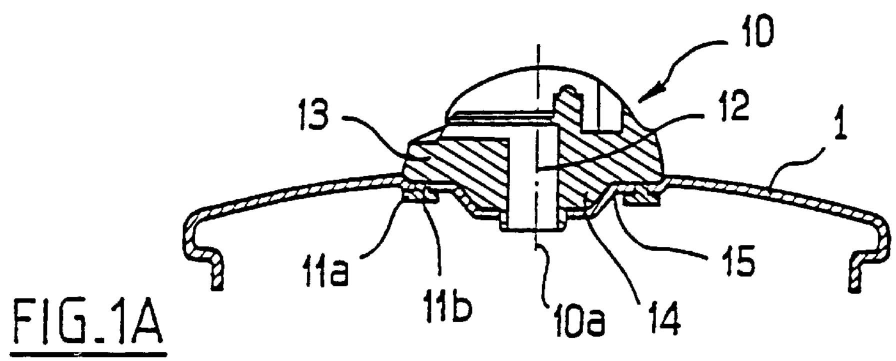
FIG_1A
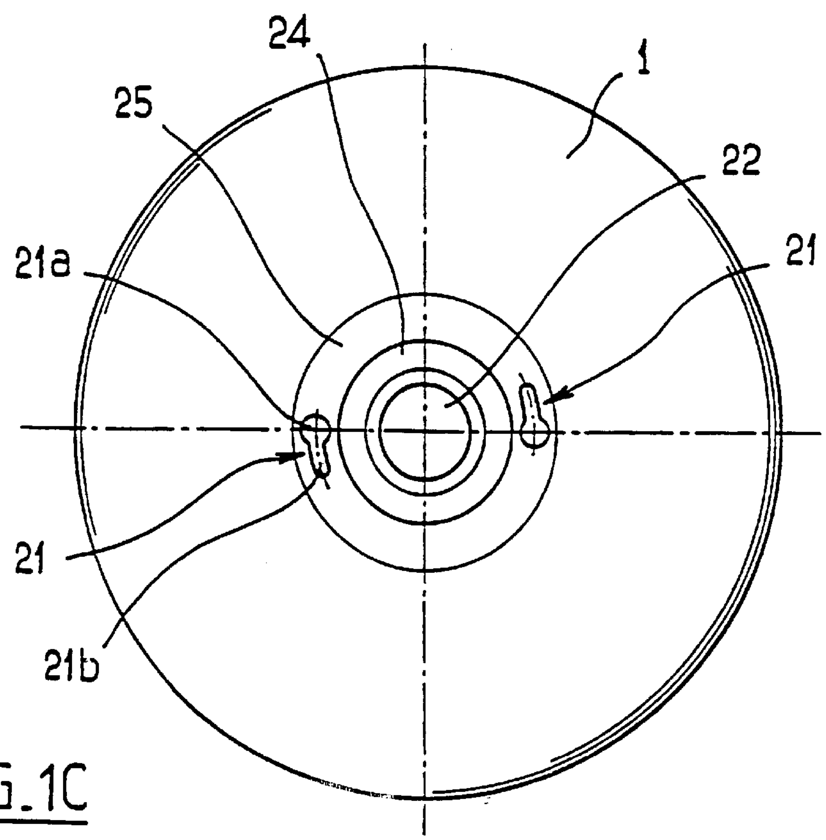
FIG_1C 10
12
14
11
15

12
10
17
13
1
15
14
11
16
10a 1
22
25
21b
24

21
21a 21a
34
30
21b
34
21

33

COVER WITH PREHENSILE BUTTON

CROSS REFERENCE TO RELATED APPLICATION

This is the 35 USC 371 national stage of international application PCT/FR96/01934 filed on Dec. 16, 1996, which designated the United States of America.

FIELD OF THE INVENTION

The present invention concerns a lid and a knob for holding it, such as a lid for cooking utensils.

BACKGROUND OF THE INVENTION

There already exist lids with a manipulator knob secured to the lid by a screw, some including an orifice for steam to escape.

These holding knobs have the disadvantage of increasing the overall size of the lid and making it difficult to stack them up.

Also, the screw generally screws into the center of the holding knob and the steam outlet orifice is at the periphery of the knob. It is then necessary to rotate the knob when screwing it to the lid to align the orifice in the knob with the steam vent in the lid.

SUMMARY OF THE INVENTION

The aim of the present invention is to eliminate the above constraints and to propose a lid and a knob for holding it which are very much simpler to assemble and use.

The lid to which the invention is directed includes a knob for holding it and coupling means for fixing the knob to the lid.

In accordance with the invention, the connecting means include a lug and a notch having a portion in which the lug enters the notch and a portion in which the lug is retained in the notch, the lug moving between the entry portion and the retaining portion when the lid and the knob are moved relative to each other.

The assembly can therefore be assembled or disassembled merely by relative movement of the knob and the lid. This provides a removable holding knob, which has many advantages: cleaning of the lid is simplified and space is saved in storage or transportation, in particular by stacking the lids.

The lid and the knob form a modular assembly, a single holding knob being usable with different lids, regardless of the material or shape of the lids.

In a preferred version of the invention the lid has a recessed part and the knob has a portion whose shape is substantially complementary to the recessed part and is adapted to move over the recessed part between the entry portion and the retaining portion of the notch.

The complementary shapes of the lid and the knob therefore guide the knob when it is fitted to the lid.

This facilitates entry of the lug into the notch and its retention therein.

The lug preferably moves between the entry portion and the retaining portion of the notch when the holding knob is rotated about a central axis of the knob.

This bayonet-type rotational fitting of the knob to the lid produces a fixing that, although it is easily demountable, is very reliable when the user is manipulating the lid by means of the holding knob.

In accordance with another aspect of the invention, a holding knob for lids is characterized in that it includes a lug adapted to engage in a notch on the lid.

BRIEF DESCRIPTION OF THE DRAWINGS

Other features and advantages of the invention will become clearer in the following description.

In the accompanying drawings, which are given by way of non-limiting example:

FIG. 1A is a view in section of a first embodiment of a lid with a holding knob in accordance with the invention;

FIG. 1B is a bottom view of the holding knob from FIG. 1A;

FIG. 1C is a top view of the lid from FIG. 1A;

DESCRIPTION OF THE PREFERRED EMBODIMENTS

Figure 2B:
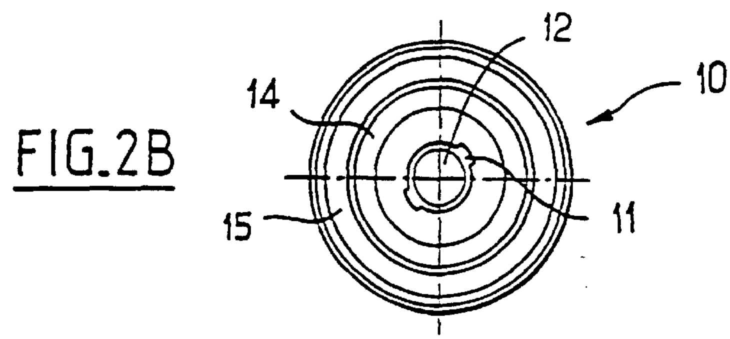
FIG. 2B is a bottom view of the holding knob from FIG. 2A.

A first embodiment of the invention will be described first with reference to FIGS. 1A, 1B and 1C.

A lid 1 in accordance with the invention includes a holding knob 10 removably fixed by means of coupling means comprising at least one lug 11 and one notch 21 in which the lug is engaged.

As shown in FIG. 1C, the notch 21 has an entry portion 21*a* through which the lug 11 can be inserted and a portion 21*b* for retaining the lug 11 in the notch 21.

The lug 11 has an enlarged end 11*a* that can pass through the orifice 21*a* of the notch and a body 11*b* of smaller section than the end 11*a* that can move in the retaining portion 21*b* of the notch. The enlarged end 11*a* of the lug cannot pass through the retaining portion 21*b* of the notch, so retaining the holding knob on the lid.

In this example, the fixing means comprise two identical lugs 11 and two corresponding notches 21.

Fixing is effected by rotating the knob 10 relative to the lid 1, the notches 21 being on a common circle whose center is the center of the lid 1.

When the holding knob 10 is rotated about its central axis 10*a,* the lugs 11 engage with the notches 21 and the holding knob is therefore positioned at the center of the lid, offering a better distribution of the weight of the lid.

The lid 1 has a recessed part 24 and the knob 10 has a portion 14 whose shape is substantially complementary to the recessed part 24 and which is adapted to move over the recessed part 24 between the entry portion 21*a* and the retaining portion 21*b* of the notch 21.

The recessed part 24 is pressed into the top surface of the lid 1 and is frustoconical in shape, the knob 10 having a frustoconical projection 14 of complementary shape to the recessed part 24.

The lid 1 further includes a shoulder 25 between the frustoconical recessed part 24 and the remainder of the lid 1 and the holding knob 10 has a flat part 15 around the complementary frustoconical portion 14, the coupling means 11, 21 being attached to the plane annular portion 15 and the shoulder 25.

The complementary frustoconical shapes of the knob 10 and the lid 1 guide rotation of the knob when it is fitted to the lid.

The lugs are on the plane annular part 15 of the holding knob 10.

The notches are in the shoulder 25 on the lid so that when the holding knob 10 is removed nothing projects from the lid 1.

The holding knob 10 preferably further comprises a steam vent 12 as its center and the lid 1 preferably comprises a corresponding central opening 22 through which steam from cooking escapes.

Figure 2A:
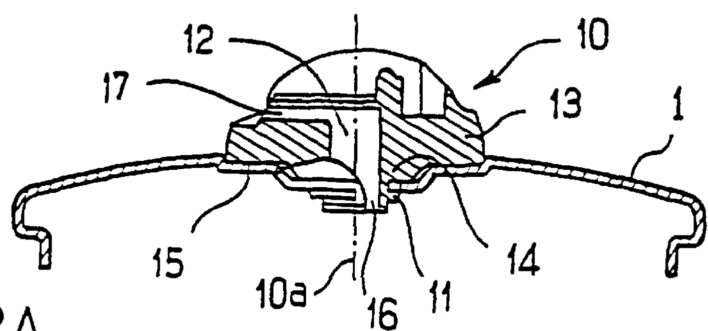
FIG. 2A is a view in section and partly in elevation of a second embodiment of a lid with a holding knob in accordance with the invention.
Figure 2C:
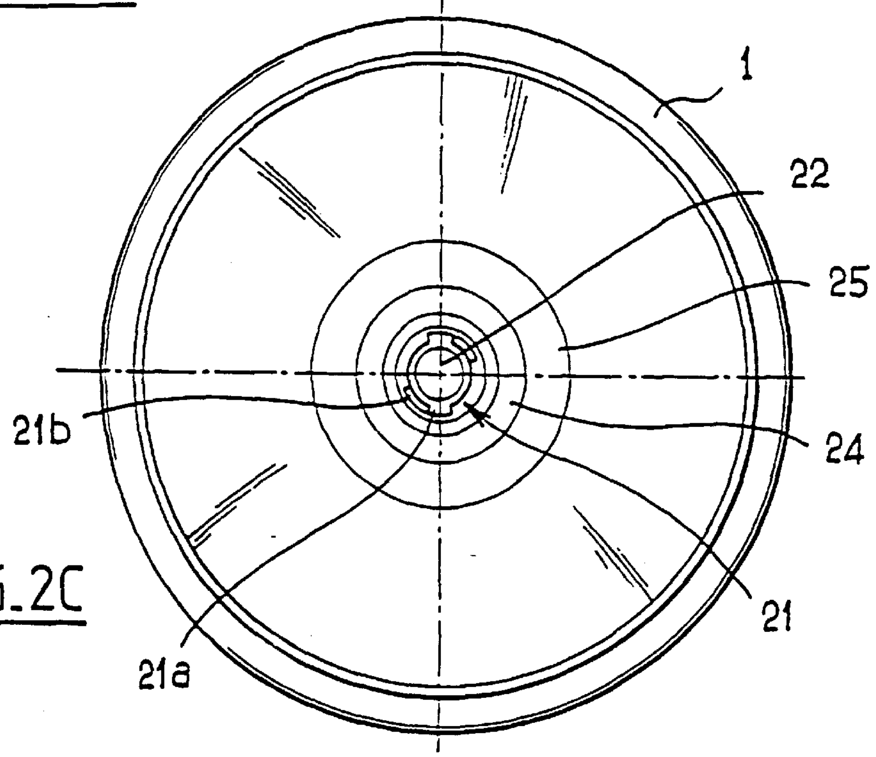
FIG. 2C is a bottom view of the lid from FIG. 2A.

In the second embodiment shown in FIGS. 2A, 2B and 2C, the coupling means are at the center of the holding knob 10 and the lid 1. Components identical to those in the first embodiment are identified by the same reference numerals in the figures and are not described again.

The knob 10 has two lugs 11 extending radially relative to its central vertical axis 10*a*.

There are two lugs 11 which therefore form projections on the end 16 of the knob 11, preferably opposite each other.

The lid 1 comprises a substantially circular opening forming a notch, each entry portion 21*a* for inserting a lug 11 of the knob 10 consisting of an angular sector and each retaining portion 21*b* consisting of another angular sector having a smaller radius than the entry portion 21*a*.

Each lug 11 extends from the axis 10*a* of the knob 10 a distance substantially equal to the radius of the angular sector formed by an entry portion 21*a* and greater than the radius of the angular sector formed by a retaining portion 21*b*.

In this embodiment the notch has two opposite entry portions 21*a* adjacent to two opposite retaining portions 21*b*.

When the knob 10 is fixed to the lid, the lugs 11 are passed through the entry portion 21*a* and are then turned under the lid 1, level with the retaining portions 21*b* of the notch 21.

In this embodiment the holding knob 10 can equally be fixed under the lid 1 by inserting the lugs 11 into the entry portions 21*a* and then turning the lugs 11 on the lid 1 over the retaining portions 21*b* of the notch 21.

The center of the notch 21 in the lid comprises an opening 22 allowing cooking steam to escape and corresponding to a passage 12 inside the knob 10 and discharging under the lid at its end 16 and having an orifice vent 17 on the lid through which steam can escape.

Figure 3:
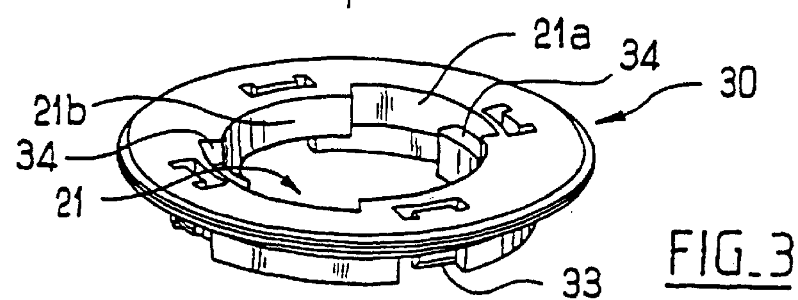
FIG. 3 is a perspective view showing one component of a variant of the FIG. 2A embodiment.

As shown in FIG. 3, the notch 21 can be formed in an insert 30. The insert 30 is fixed in an opening 22 in the lid 1 and is thicker than the lid.

The circular insert 30 can be fixed to the edges of the central opening 12 in the lid, by clipping it by means of elastic lugs 33, by gluing it or by mechanically crimping it.

It avoids the presence of a sharp edge because the notch 21 is formed directly in the lid and eliminates the constraint of the thickness of the lid.

The insert has two notches 21 as previously described for fixing the knob. It can be made of metal or a plastics material.

The insert 30 can also have two other notches 34, similar to the notches 21 and enabling the holding knob to be fixed to the underside of the lid 1, in particular for storing the lid.

Each notch 34 can have an entry portion common to an entry portion 21*a* of the notches 21 and a retaining portion disposed symmetrically to the retaining portion 21*b* relative to the entry portion 21*a*. The retaining portions of the notches 21 and 34 are reversed relative to each other within the thickness of the insert 30, i.e. the retaining portion 21*b* of the notch 21 is in the lower part of the insert 30 and the retaining portion of the notch 34 is in the upper part of the insert 30 when the latter is fixed to the lid 1.

When the knob 10 is fixed to the lid 1, the lug 11 is passed through the entry portion 21*a* from the upper part toward the lower part of the insert 30 and is then pivoted under the retaining portion 21*b*. When the knob 10 is fixed to the underside of the lid, the lug 11 is passed through the entry portion 21*a* from the lower part toward the upper part of the insert 30 and is then pivoted over the retaining portion of the notch 34.

Of course, many modifications can be made to the above examples without departing from the scope of the invention.

For example, the knob could be fixed to the lid by moving it in translation in straight notches in the lid.

By adding a non-return member to one lug of the knob, the knob can be permanently fitted when it is locked to the lid for the first time, after passing beyond a predetermined angular threshold.

The knob 10 could equally well be in the shape of a hoop or a handgrip.

What is claimed is:

1. A lid for cooking utensils, comprising:

a holding knob;

coupling means for fixing the knob to the lid; said coupling means including a notch on the lid and a lug on the holding knob, said notch having an entry portion for receiving the lug into the notch and a retaining portion for retaining the lug in the notch; the lug being structured and arranged to move between the entry portion and the retaining portion of the notch when the knob and the lid are moved relative to each other; said coupling means are positioned at the center of the holding knob and the lid; said notch being formed in an insert, and the insert being fixed into an opening in the lid and being thicker than the lid;

the lid having a recessed part housing the coupling means, and a shoulder between the recessed part and the remainder of the lid;

the holding knob having a portion of substantially complementary shape to said recessed part;

said holding knob being adapted to be moved over the recessed part between the entry portion and the retaining portion of the notch, such that when the holding knob is removed nothing projects from the lid.

2. The lid according to claim 1, wherein the holding knob further comprises a plane annular part around said complementary shape portion.

3. The lid according to claim 1, wherein the recessed part is pressed into a top surface of the lid.

4. The lid according to claim 1, wherein the lug is mobile between the entry portion and the retaining portion of the notch when the holding knob rotates about a central axis of the knob.

5. The lid according to claim 1, wherein the recessed part is frustoconical, and the knob has a frustoconical projection of complementary shape through said recessed part.

6. The lid according to claim 1, wherein the insert has two first notches having retaining portions reversed within the thickness of the insert relative to retaining portions of two second notches, the first and second notches having common entry portions, enabling the holding knob to be fixed either to the upper side or to the underside of the lid.

7. A lid for cooking utensils, comprising:

a holding knob;

coupling means for fixing the knob to the lid; said coupling means including a notch and a lug, said notch having an entry portion for receiving the lug into the notch and a retaining portion for retaining the lug in the notch; the lug being structured and arranged to move between the entry portion and the retaining portion of the notch when the knob and the lid are moved relative to each other;

the lid having a recessed part and a shoulder between the recessed part and the remainder of the lid;

the holding knob having a portion of substantially complementary shape to said recessed part, and a plane annular part around said complementary shape portion;

said coupling means being attached to the plane annular portion and the shoulder;

said holding knob being adapted to be moved over the recessed part between the entry portion and the retaining portion of the notch, such that when the holding knob is removed nothing projects from the lid.

8. The lid according to claim 7, wherein the recessed part is pressed into a top surface of the lid.

9. The lid according to claim 7, wherein the lug is mobile between the entry portion and the retaining portion of the notch when the holding knob rotates about a central axis of the knob.

10. The lid according to claim 7, wherein the recessed part is frustoconical, and the knob has a frustoconical projection of complementary shape through said recessed part.

11. The lid according to claim 7, wherein the lug is on the holding knob, and the notch is on the lid.

12. The lid according to claim 11, wherein the notch is formed in an insert, and the insert is fixed into an opening in the lid and is thicker than the lid.

13. The lid according to claim 12, wherein the insert has two first notches having retaining portions reversed within the thickness of the insert relative to retaining portions of two second notches, the first and second notches having common entry portions, enabling the holding knob to be fixed either to the upper side or to the underside of the lid.

* * * * *